US007999816B2

(12) United States Patent
Onuma et al.

(10) Patent No.: US 7,999,816 B2
(45) Date of Patent: Aug. 16, 2011

(54) VIDEO DISPLAY APPARATUS

(75) Inventors: Hideki Onuma, Tokyo (JP); Naoya Matsuda, Tokyo (JP)

(73) Assignee: Sony Corporation (JP)

( * ) Notice: Subject to any disclaimer, the term of this patent is extended or adjusted under 35 U.S.C. 154(b) by 1306 days.

(21) Appl. No.: 10/493,664

(22) PCT Filed: Sep. 11, 2003

(86) PCT No.: PCT/JP03/11640

§ 371 (c)(1), (2), (4) Date: Nov. 22, 2004

(87) PCT Pub. No.: WO2004/025619

PCT Pub. Date: Mar. 25, 2004

(65) Prior Publication Data

US 2005/0080939 A1 Apr. 14, 2005

(30) Foreign Application Priority Data

Sep. 11, 2002 (JP) ............................... P2002-265794

(51) Int. Cl.
*G06T 1/60* (2006.01)

(52) U.S. Cl. ........................................ 345/530; 345/537

(58) Field of Classification Search ................... 345/530
See application file for complete search history.

(56) References Cited

U.S. PATENT DOCUMENTS

| | | | | |
|---|---|---|---|---|
| 6,753,881 | B1 * | 6/2004 | Callway et al. | 345/699 |
| 7,225,282 | B1 * | 5/2007 | Lyle | 710/105 |
| 2001/0002124 | A1 * | 5/2001 | Mamiya et al. | 345/132 |
| 2001/0004257 | A1 * | 6/2001 | Nitta et al. | 345/211 |
| 2001/0030649 | A1 * | 10/2001 | Mamiya et al. | 345/530 |
| 2001/0050679 | A1 * | 12/2001 | Shigeta | 345/204 |
| 2002/0089518 | A1 * | 7/2002 | Shigeta | 345/629 |
| 2002/0188770 | A1 * | 12/2002 | Kehlet | 710/8 |
| 2003/0025685 | A1 * | 2/2003 | Shirasaki et al. | 345/204 |

* cited by examiner

*Primary Examiner* — Xiao M Wu
*Assistant Examiner* — Maurice McDowell, Jr.
(74) *Attorney, Agent, or Firm* — Lerner, David, Littenberg, Krumholz & Mentlik, LLP

(57) ABSTRACT

A video display apparatus that supports a display data channel (DDC) standard includes: one DDC-supported non-volatile memory and a control unit for writing, based on information indicating the kind of input video signal, extended display identification (EDID) data for this input video signal out of EDID data for plural kinds of video signals into the DDG-supported non-volatile memory. Accordingly, in the video display apparatus that supports DDC, it becomes possible to make the host side perform settings for plural kinds of video signals in accordance with properties of the video display apparatus, and also a reduction in cost and down-sizing are facilitated.

6 Claims, 4 Drawing Sheets

VIDEO DISPLAY APPARATUS

TECHNICAL FIELD

The present invention relates to a video display apparatus that supports DDC (Display Data Channel).

BACKGROUND ART

As a standard of so called plug-and-play for a video display apparatus, there exists a standard called DDC (Display Data Channel). DDC is provided to exchange property information attributed to a video display apparatus (optimal resolution and the like) between a host (an apparatus which outputs a video signal) and the video display apparatus, so that the host side automatically performs settings corresponding to the properties of the video display apparatus.

In DDC, the property information attributed to the video display apparatus is exchanged in the form of formatted data called EDID (Extended Display Identification Data). Further, even in the state where power of the video display apparatus is being turned off, the EDID data can be transmitted from the video display apparatus to the host by supplying electric power from the host side to the video display apparatus. Hence, the EDID data is stored in a non-volatile memory such as an EEPROM in the video display apparatus so that the EDID data shall not vanish even in the state where the power is being turned off.

In the past, video output equipment that supports DDC was only a computer apparatus. As resolution of a RGB signal output from the computer apparatus, there exist such kinds as VGA, SVGA, XGA, and SXGA. Then, with respect to the resolution in a conventional video display apparatus that supports DDC, EDID data for the RGB signal having contents of, for example, "SVGA is optimal" was stored in a non-volatile memory (refer to, for example, FIG. 6 in page 2 of Japanese laid-open patent application No. H9-128330).

On the other hand, equipment that supports DDC has recently appeared also in an STB (Set Top Box) for DTV (Digital Television Broadcasting). As resolution of a television signal for the DTV (hereinafter, referred to a "DTV signal"), there exist such kinds as 1080I, 480I, 480P, and 720P (I and P represent distinction of a scanning method either Interlace or Progressive).

When a video display apparatus that supports DDC makes such STB perform settings in accordance with properties of the video display apparatus, with respect to the resolution, EDID data for a DTV signal having contents of, for example, "4801I is optimal" also needs to be stored in the non-volatile memory.

However, in DDC, EDID data items are each defined to be stored in a designated address inside a memory. FIG. 1 shows areas of the memory used by DDC. An area consisting of address 0-127 (byte) is defined as a standard area for storing the EDID data, and areas consisting of address 128-191, address 192-255, address 256-319, and address 320-383 are respectively defined as extended areas. Further, it is defined that the EDID data relating to the resolution should be stored in a predetermined address inside the standard area. Only one EDID data relating to the resolution (in case of the above described example, either the data of "SVGA is optimal" or the data of "480I is optimal") can be stored in this predetermined address.

Moreover, although the EDID data for the RGB signal is normally stored only using the standard area, the EDID data for the DTV signal can not be stored only within the standard area and it is assumed that extended areas of address 128-191 and address 192-255 are to be used for storing. Further, in the predetermined address of the standard area, it is defined that data having contents of "read out EDID data from the extended area as well" is to be written when the EDID data is also stored in the extended area, and on the contrary, data having contents of "do not read out EDID data from the extended area" is to be written when the EDID data is not stored in the extended area. Therefore, except for a particular case in which EDID data for a RGB signal is stored also using the extended area, contents of data will be different in this predetermined address of the standard area when storing the EDID data for the DTV signal and when storing the EDID data for the RGB signal.

Due to the reason as described above, both the EDID data for the RGB signal and the EDID data for the DTV signal can not be stored in one non-volatile memory.

Accordingly, in order for settings in accordance with properties of a video display apparatus to be performed by both the computer apparatus and STB (to be performed on both the RGB signal and DTV signal), a method in which a non-volatile memory to store the EDID data for the RGB signal and a non-volatile memory to store the EDID data for the DTV signal are provided separately may be considered, for example.

FIG. 2 is a block diagram showing an example in which the above described method is realized. The EDID data for the RGB signal is stored in a DDC-supported EEPROM (a DDC-supported non-volatile memory will later be described) 31 and the EDID data for the DTV signal is stored in a DDC-supported EEPROM 32. A switch circuit 33 is provided for switching a computer apparatus and a STB connected to a video display apparatus to be connected to either the DDC-supported EEPROM 31 or the DDC-supported EEPROM 32.

When the computer apparatus is connected to the video display apparatus, a CPU 34 in the video display apparatus controls the switch circuit 33 based on an operation by a user or the like, so that the DDC-supported EEPROM 31 can be connected to the computer apparatus. Accordingly, since the EDID data for the RGB signal is exchanged between the computer apparatus and the video display apparatus, it is possible to make the computer apparatus perform settings for the RGB signal in accordance with properties of the video display apparatus.

On the other hand, when the STB is connected to the video display apparatus, the CPU 34 in the video display apparatus controls the switch circuit 33 based on the operation by the user or the like, so that the DDC-supported EEPROM 32 can be connected to the STB. Therefore, since the EDID data for the DTV signal is exchanged between the STB and the video display apparatus, it is also possible to make the STB perform settings for the DTV signal in accordance with properties of the video display apparatus.

However, when such method as illustrated in FIG. 2 is used, since the number of non-volatile memories increases in a video display apparatus, as a result the cost becomes high and increase in the area of a circuit board makes the whole video display apparatus difficult to be small-sized.

Particularly, although there are DDC-1 (in which information is transmitted uni-directionally from a video display apparatus to a host) and DDC-2 (in which bi-directional communications can be performed between the video display apparatus and the host) in DDC, DDC-1 and DDC-2 each have different communication protocols and the DDC-1 communication protocol is not supported by a non-volatile memory such as an ordinary EEPROM.

Therefore, in order to exchange EDID data with each of a host that supports DDC-1 and a host that supports DDC-2, it is necessary to store the EDID data in a particularly equipped non-volatile memory that supports both the DDC-1 communication protocol and DDC-2 communication protocol (refer to "a DDC-supported non-volatile memory" in this description. The DDC-supported EEPROM 31 and EEPROM 32 in FIG. 2 are also such DDC-supported non-volatile memories.).

This DDC-supported non-volatile memory is more expensive than an ordinary non-volatile memory. Therefore, such method as illustrated in FIG. 2 causes further increase in cost from this standpoint.

Also, there are at present only two kinds of DDC-supported image output equipment which are a computer apparatus outputting a RGB signal and a STB outputting a DTV signal. However, it is also predicted that in the future there will appear DDC-supported equipment that outputs a video signal other than the RGB signal and the DTV signal (for example, a digital component signal).

In such a case, if the method as illustrated in FIG. 2 is used, whenever a kind of video signal increases, the number of non-volatile memories needs to be increased, so that further increases in cost and in the area of the circuit board will inevitably occur.

In view of the above, the present invention is implemented with the object of enabling the host side to perform settings for plural kinds of video signals in accordance with properties of a video display apparatus and also, of facilitating reduction in cost and down-sizing, with respect to the video display apparatus that supports DDC.

DISCLOSURE OF THE INVENTION

In order to solve the above problems, applicants of the present invention provide a video display apparatus that supports DDC and includes: one DDC-supported non-volatile memory and a control means for writing EDID data corresponding to input video signal out of EDID data of plural kinds of video signal into the DDC-supported non-volatile memory, based on information indicating the kind of input video signal.

In the video display apparatus, only one DDC-supported non-volatile memory is provided irrespective of kinds of a video signal. Then, when a certain kind of video signal is input into the video display apparatus from a host, based on information indicating the kind of video signal, EDID data corresponding to the video signal out of EDID data for plural kinds of video signals is written into this DDC-supported non-volatile memory by the control means. Accordingly, since the EDID data corresponding to the video signal is exchanged between the host and the video display apparatus, it becomes possible to make the host side perform settings for the video signal in accordance with properties of the video display apparatus.

Furthermore, when another kind of video signal is input thereafter into the video display apparatus from the host, based on information indicating another kind, the EDID data in the DDC-supported non-volatile memory is re-written by control means into EDID data corresponding to another kind of video signal out of EDID data for plural kinds of video signals. Accordingly, since the EDID data corresponding to another kind of video signal is exchanged between the host and the video display apparatus at this time, it becomes possible to make the host side perform settings for another kind of video signal in accordance with properties of the video display apparatus.

Thus, in this video display apparatus, EDID data corresponding to the kind of video signal input from a host is dynamically written into a DDC-supported non-volatile memory.

Accordingly, the host side can perform settings for plural kinds of video signals in accordance with properties of the video display apparatus.

Moreover, since only one DDC-supported non-volatile memory is provided, reduction in cost of the video display apparatus can be facilitated and the whole video display apparatus can be down-sized as the area of a circuit board is made small.

In addition, as an example in this video display apparatus, it is preferable that further an operation means for selecting an input video signal from among plural kinds of video signals is provided, so that the control means writes EDID data corresponding to the input video signal into the DDC-supported non-volatile memory based on information indicating the result of the selection performed by the operation means.

Accordingly, in case a user connects a host outputting a kind of video signal to this video display apparatus, an operation of selecting the video signal is performed by the above operation means, so that EDID data corresponding to the video signal can be written into the DDC-supported non-volatile memory.

Further, as an example in this video display apparatus, it is preferable to store EDID data for plural kinds of video signals together with other data in a memory provided to store various data items in the video display apparatus.

Furthermore, in case contents are not altered after forming EDID data, it is also preferable to keep those EDID data stored in a built-in memory in the control means together with programs which should be executed by the control means.

As described above, EDID data for plural kinds of video signals are stored in a memory that is provided as a standard equipment in the video display apparatus, so that reduction in cost of the video display apparatus and down-sizing of the whole video display apparatus can be further facilitated.

Further, as an example in the video display apparatus, it is preferable that a switching means for switching the connection of the DDC-supported non-volatile memory either to a first terminal to supply EDID data or to a second terminal to perform communications with a host which supplies input video signals is further included, and when writing into the DDC-supported non-volatile memory is performed, the control means makes the switching means connect the DDC-supported non-volatile memory to the first terminal so as to be disconnected from the host.

If the DDC-supported non-volatile memory is connected to the host at the time of writing EDID data into the DDC-supported non-volatile memory, there may arise such cases in which EDID data in the middle of writing (different data from proper EDID data which should be transmitted) may be transmitted to the host due to the communication between the DDC-supported non-volatile memory and the host, and trouble may occur in the communication between the DDC-supported non-volatile memory and the control means due to the communication between the DDC-supported non-volatile memory and the host.

Accordingly, by disconnecting the DDC-supported non-volatile memory from the host at the time of writing into the DDC-supported non-volatile memory, it becomes possible to prevent such cases, because there is no communication performed between the DDC-supported non-volatile memory and the host during the writing.

After the DCC-supported non-volatile memory is connected to the first terminal and the writing into the DDC-supported non-volatile memory is completed, it is preferable for the control means to make the switching means connect the DDC-supported non-volatile memory to the second terminal. Also, it is preferable to supply EDID data to the first terminal of this switching means by the control means.

Moreover, as an example in this video display apparatus, it is preferable that a memory for storing EDID data for plural kinds of video signals is further provided, and when information indicating the kind of input video signal has been changed, the control means reads out EDID data corresponding to the information indicating the kind of changed input video signal from this memory and writes the data into the DDC-supported non-volatile memory.

Accordingly, in case the information indicating the kind of input video signal has been changed, the EDID data corresponding to the information indicating the kind of changed input video signal is written into the DDC-supported non-volatile memory from the memory.

BEST MODE FOR CARRYING OUT THE INVENTION

Figure 1:
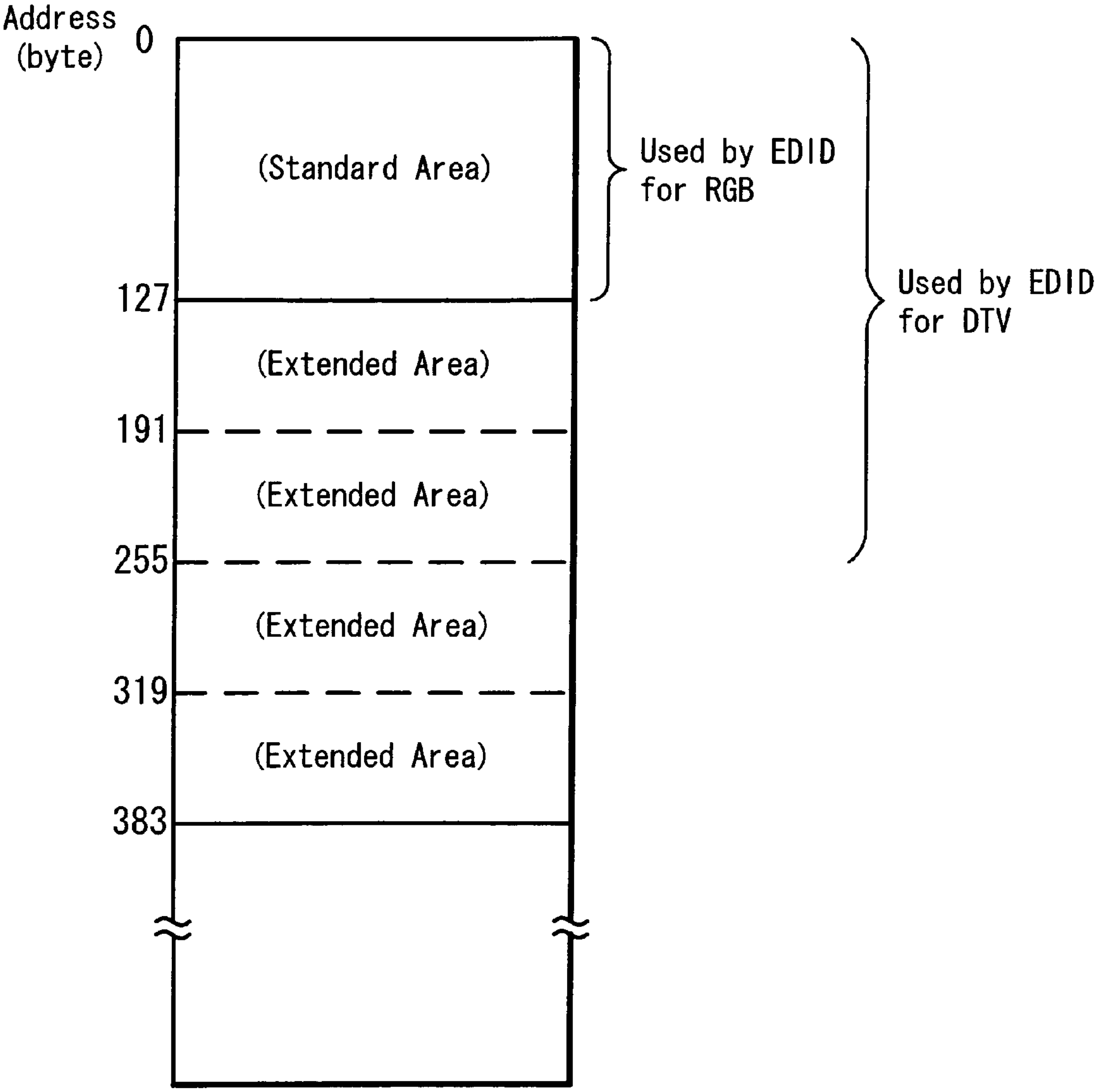
FIG. 1 is a diagram showing areas used by DDC in a memory.
Figure 2:
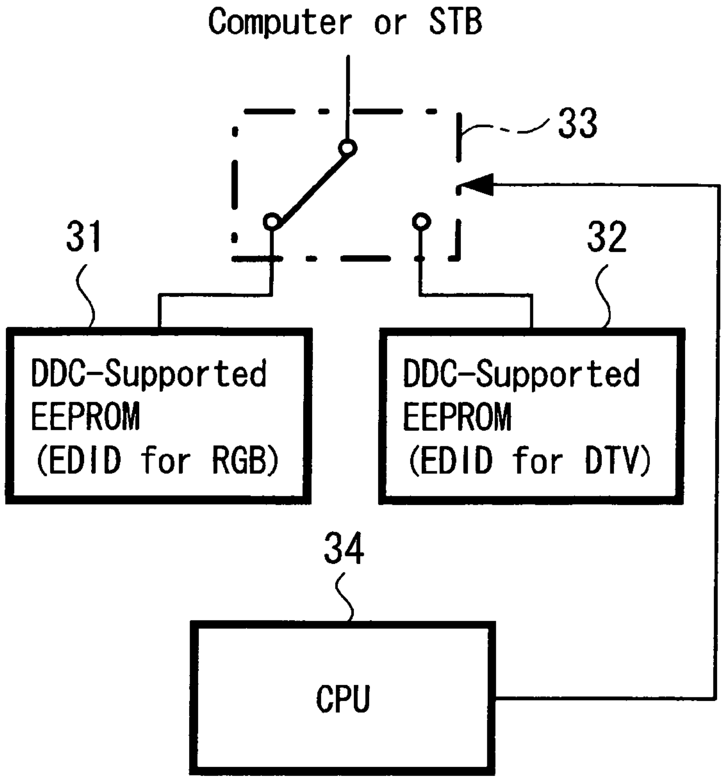
FIG. 2 is a diagram showing an example of separately providing a memory to store EDID data for a RGB signal and a memory to store EDID data for a DTV signal.

Hereinafter, an example, in which the present invention is applied to a liquid crystal projector, is specifically explained by referring to the drawings.

Figure 3:
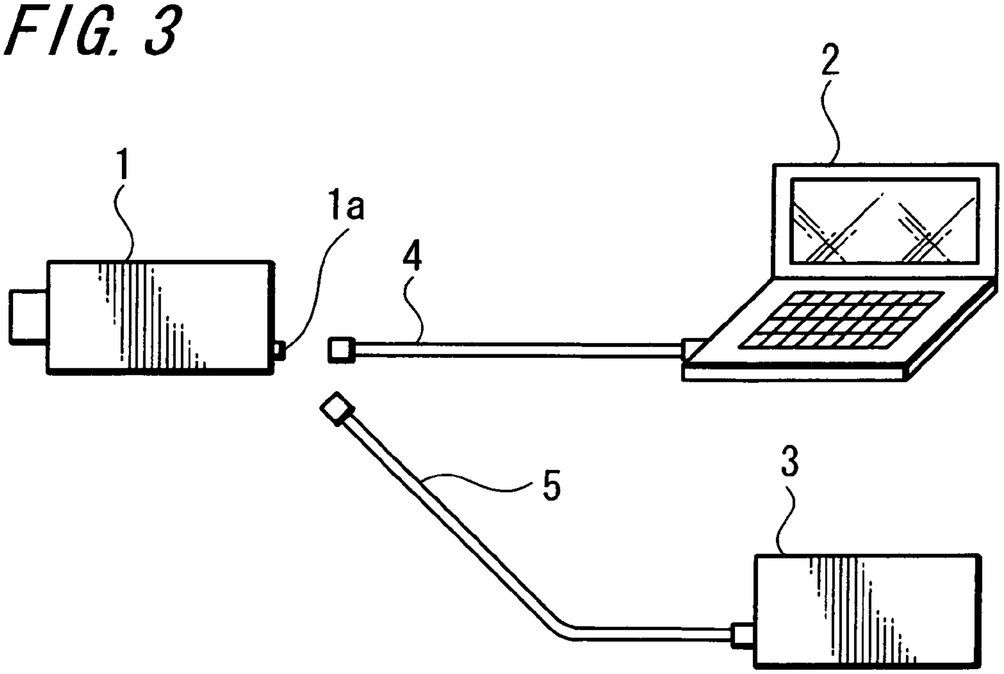
FIG. 3 is a diagram showing a state in which a liquid crystal projector and a host are connected, to which the present invention is applied.

FIG. 3 is a diagram showing a state in which a liquid crystal projector to which the present invention is applied, and a host computer and an STB (Set Top Box) are connected. This liquid crystal projector 1 supports DVI (Digital Visual Interface) which is a standard for digital transmission of a video signal. A personal computer (hereunder, simply referred to as a computer) 2 and an STB 3 also support the DVI. A DVI connector 1*a* of the liquid crystal projector 1 is connected to a DVI connector (not shown in the drawing) of the computer 2 using a DVI cable 4, thereby connecting the liquid crystal projector 1 and the computer 2. On the other hand, the DVI connector 1*a* is connected to a DVI connector (not shown in the drawing) of the STB 3 using a DVI cable 5, thereby connecting the liquid crystal projector 1 and the STB 3.

In the DVI, it is mandatory to employ DDC and the DVI connector is also provided with a DDC terminal for receiving and transmitting EDID data.

Figure 4:
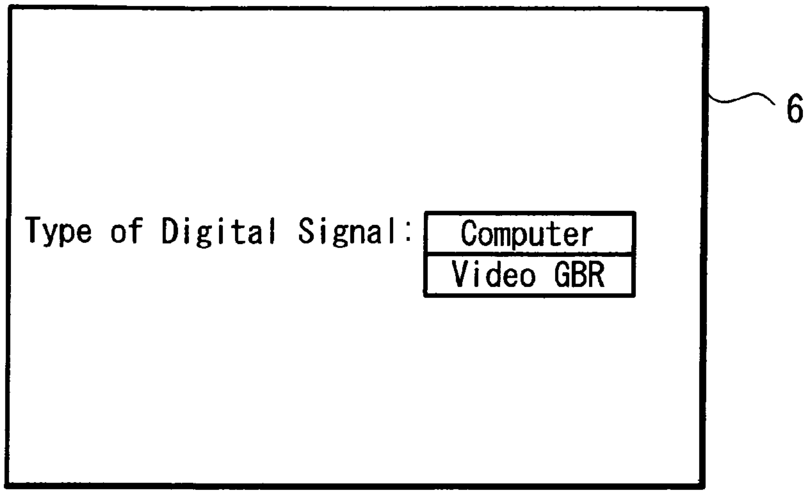
FIG. 4 is a diagram showing a menu screen of a liquid crystal projector to which the present invention is applied.

FIG. 4 shows a portion relating to the present invention of a menu screen displayed in an operation panel on the surface of a body of the liquid crystal projector 1. On the menu screen 6, letters of “computer” to select a RGB signal from a computer are displayed as the kind of input digital video signal, and letters of “video GBR” to select a DTV signal as the kind of the digital video signal are displayed. By shifting the position of a cursor to letters indicating a desired digital video signal out of those two groups of letters and by performing an operation on the operation panel so as to secure the cursor position on either of them, the desired digital video signal can be selected.

Figure 5:
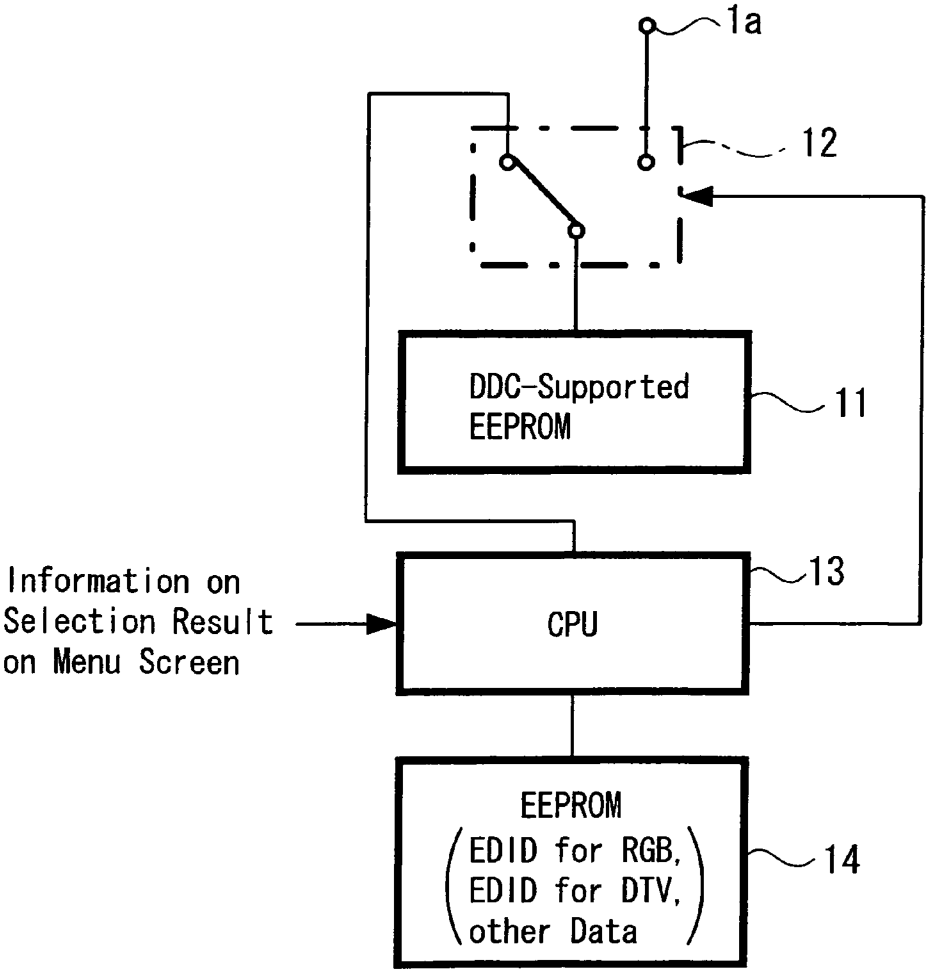
FIG. 5 is a diagram showing an example of a circuit configuration of a liquid crystal projector to which the present invention is applied.

FIG. 5 shows an example of a configuration of portions relevant to the present invention of the circuit in the liquid crystal projector 1. In this liquid crystal projector 1, only one DDC-supported EEPROM 11 is provided as an DDC-supported non-volatile memory. EDID data is not stored in the DDC-supported EEPROM 11 at the time of shipment.

A switch circuit 12 is provided between the DDC-supported EEPROM 11 and the DVI connector 1*a* (shown in FIG. 3). By means of the switch circuit 12, the DDC-supported EEPROM 11 is switched either to a CPU 13 in the liquid crystal projector 1 or to the DVI connector 1*a* to be connected. The CPU 13 is to control each portion within the liquid crystal projector 1 and information indicating the result of the selection on the menu screen 6 shown in FIG. 4 is also sent to this CPU 13 from the operation panel.

An EEPROM 14 is a memory to store various data items, which is a standard equipment in the liquid crystal projector 1. As an aspect of the present invention, EDID data for the RGB signal (as to the resolution, for example, data having contents of “SVGA is optimal”) and EDID data for the DTV signal (as to the resolution, for example, data having contents of “480I is optimal”) are being stored together with other data items in the EEPROM 14.

Figure 6:
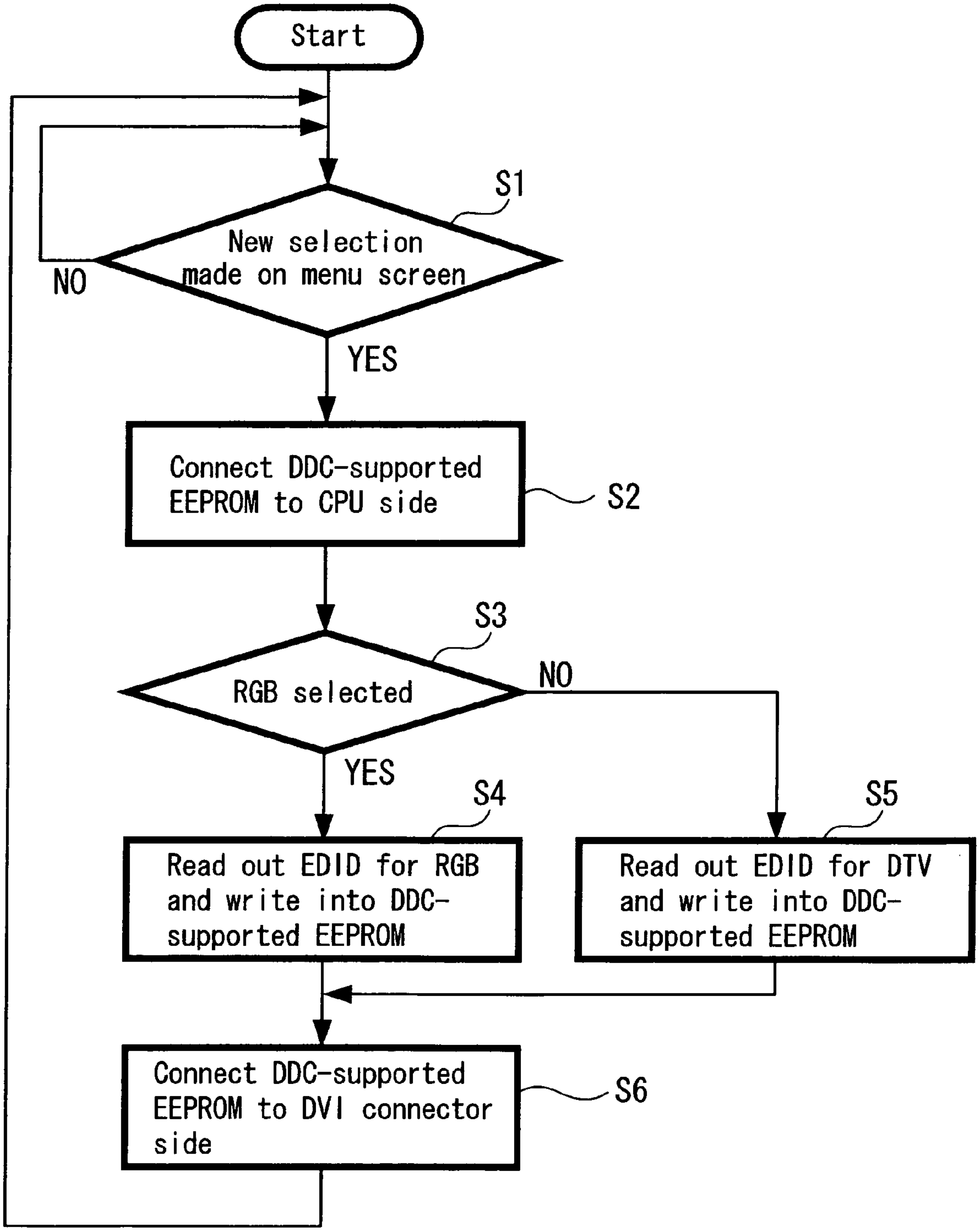
FIG. 6 is a flow chart showing processing of a CPU in FIG. 5.

FIG. 6 is a flow chart showing processing carried out by the CPU 13 in order to enable exchange of EDID data to be performed between the liquid crystal projector 1 and a host. In this processing, first, it is judged, based on information from the operation panel, whether or not a digital video signal having not been selected is newly selected on the menu screen 6 shown in FIG. 4 (step S1).

If it is judged “no”, this judgment will be repeated. Then, when it turns to be “yes”, the switch circuit 12 is controlled so as to make the DDC-supported EEPROM 11 connect to the side of the CPU 13 (step S2).

Successively, it is judged whether or not the newly selected signal on the menu screen 6 is a RGB signal (step S3). If it is judged “yes”, the EDID data for the RGB signal is read out from the EEPROM 14 and the EDID data is written into the DDC-supported EEPROM 11 through the switch circuit 12 (step S4).

On the other hand, if it is judged “no” at the step 3 (in case that a DTV signal is newly selected), EDID data for the DVT signal is read out from the EEPROM 14 and the EDID data is written into the DDC-supported EEPROM 11 through the switch circuit 12 (step S5).

After finishing the step S4 or step S5, the switch circuit 12 is controlled to make the DDC-supported EEPROM 11 connect to the side of the DVI connector 1*a* (step S6). Then, those steps starting from the step S1 are repeated by returning to the step S1.

Next, explanations will be given to the state in which EDID data is exchanged between the liquid crystal projector 1 and the computer 2 or the STB 3 shown in FIG. 3. After the liquid crystal projector 1 is purchased, when the liquid crystal projector 1 is first connected to, for example, the computer 2 using the DVI cable 4, a user selects the “computer” (RGB signal) on the menu screen 6 shown in FIG. 4.

Then, the processing of the steps S1 to S4 and S6 shown in FIG. 6 is carried out by the CPU 13, whereby the EDID data for the RGB signal out of EDID data for the RGB signal and EDID data for the DTV signal in the EEPROM 14 is written into the DDC-supported EEPROM 11. Hence, since the EDID data for the RGB signal is exchanged between the computer 2 and the liquid crystal projector 1, the computer 2 can perform settings for the RGB signal in accordance with properties of the liquid crystal projector 1.

Thereafter, when the liquid crystal projector 1 is secondly connected to the STB 3 using the DVI cable 5, the user selects the "video GBR" (DTV signal) on the menu screen 6 shown in FIG. 4.

Then, the processing of the steps S1 to S3, S5, and S6 shown in FIG. 6 is carried out by the CPU 13, whereby the EDID data in the EEPROM 14 is rewritten into the EDID data for the DTV signal. As a result, since the EDID data for the DTV signal is exchanged this time between the STB 3 and the liquid crystal projector 1, the STB 3 can perform settings for the DTV signal in accordance with properties of the liquid crystal projector 1.

As described above, in this liquid crystal projector 1, when the user connects the liquid crystal projector 1 to the host (the computer 2 or the STB 3), the operation of selecting the video signal (RGB signal or DTV signal) output by the host is performed on the menu screen 6 of the operation panel, so that EDID data corresponding to the kind of video signal input from the host is dynamically written into the DDC-supported EEPROM 11.

Accordingly, it is possible to make the host side perform settings with respect to two kinds of video signals of the RGB signal and the DTV signal in accordance with properties of the video display apparatus.

Also, since only one DDC-supported EEPROM 11 is provided, reduction in cost of the liquid crystal projector 1 can be facilitated and down-sizing of the whole liquid crystal projector 1 can be facilitated as the area of a circuit board can be made small.

Further, in this liquid crystal projector 1, EDID data for the RGB signal and EDID data for the DTV signal, which are dynamically written into the DDC-supported EEPROM 11, are stored in the EEPROM 14 that is a standard equipment in the liquid crystal projector 1. In other words, there is no memory newly provided to store those EDID data. Therefore, reduction in cost of the liquid crystal projector 1 and the down-sizing of the whole liquid crystal projector 1 are further facilitated from this standpoint.

Furthermore, when EDID data is written into the DDC-supported EEPROM 11, if the DDC-supported EEPROM 11 is connected to a host (a host is connected to the liquid crystal projector 1 using the DVI cable), there may arise such cases that EDID data in the middle of writing (data different from proper EDID data which should be transmitted) may be transmitted to the host due to the communication performed between the DDC-supported EEPROM 11 and the host and trouble may occur in the communication between the DDC-supported EEPROM 11 and the CPU 13 due to the communication between the DDC-supported EEPROM 11 and the host.

On the contrary, in the above liquid crystal projector 1 according to the present invention, on the writing of EDID data into the DDC-supported EEPROM 11, the DDC-supported EEPROM 11 is not connected to the DVI connector 1*a* (the DDC-supported EEPROM 11 is disconnected from the host) (the step S2 in FIG. 6). Therefore, since there is no communication performed between the DDC-supported EEPROM 11 and the host in the middle of the writing, such cases as transmitting to the host different data from the proper EDID data which should be transmitted and causing a trouble in the communication between the DDC-supported EEPROM 11 and the CPU 13 due to the communication between the DDC-supported EEPROM 11 and the host, can be prevented from occurring.

Further, in the above described example, the CPU 13 determines the kind of EDID data to be written into the DDC-supported EEPROM 11 based on information indicating the result of the selection on the menu screen 6 shown in FIG. 4. However, as another example, it is also possible that the CPU 13 carries out processing of automatically judging the kind of video signal input from a host and determines the kind of EDID data to be written into the DDC-supported EEPROM 11 based on the information obtained by this processing.

As a method for automatically judging processing, a trial-and-error method can be considered, in which EDID data to be written first in the DDC-supported EEPROM 11 is determined to be, for example, the EDID data for the RGB signal; when a video signal has been input from a host, the video signal to be input from the host is judged to be the RGB signal; on the other hand, when a video signal has not been input from the host, the video signal to be input from the host is judged to be the DTV signal (in that case, the EDID data for the DTV signal shall be rewritten into the DDC-supported EEPROM 11).

Also, in the above described example, EDID data for the RGB signal and EDID data for the DTV signal are stored in the EEPROM 14. However, as another example, it is also possible to store those EDID data in a built-in program memory (a flush memory or the like) in the CPU 13 together with programs which should be executed by the CPU 13, if there is no possibility of changing contents of those EDID data after forming thereof.

In addition, in the above described examples the present invention is applied to the liquid crystal projector supporting the DVI. However, since there also exists a liquid crystal projector not supporting the DVI and only inputting an analog video signal but supporting DDC, the present invention may be applied to such liquid crystal projector as well.

Moreover, in the above described examples, the two kinds of EDID data of EDID data for the RGB signal and EDID data for the DTV signal are dynamically written into the DDC-supported EEPROM 11. However, when there appears equipment supporting DDC and outputting, for example, a digital component signal in the future, three kinds of EDID data of EDID data for the RGB signal, EDID data for the DTV signal, and EDID data for the digital component signal can be dynamically written into the DDC-supported EEPROM 11 (also selection of the digital component signal is made possible on the menu screen 6 and EDID data for the digital component signal is also written into the EEPROM 14).

Further, although the present invention is applied to a liquid crystal projector in the above described examples, the present invention can also be applied to a video display apparatus other than the liquid crystal projector (a plasma display, for example, and the like) which supports DDC.

Furthermore, it is obvious that the present invention is not limited to the above described examples but can be applied to various other constructions without departing from the gist thereof.

As mentioned above, according to the present invention, in a video display apparatus that supports DDC, since EDID data corresponding to the kind of video signal input from a host is dynamically written into one DDC-supported non-volatile memory, it is possible to make the host side perform settings for plural kinds of video signals in accordance with properties of the video display apparatus; and accordingly such effectiveness as facilitating reduction in cost of the video display apparatus and down-sizing of the whole video display apparatus can be obtained.

Further, a host outputting a certain kind of video signal is connected by a user to the video display apparatus and an operation of selecting the video signal is performed by the same, thereby EDID data for the video signal being written into the one DDC-supported non-volatile memory.

Further, since EDID data for plural kinds of video signals are stored in a memory that is a standard equipment in the video display apparatus, such effectiveness as reduction in cost of the video display apparatus and down-sizing of the whole video display apparatus can further be facilitated.

Furthermore, since a DDC-supported non-volatile memory is disconnected from the host at the time of writing into the DDC-supported non-volatile memory, it is also possible to obtain such effectiveness that cases, in which different data from proper EDID data which should be transmitted is transmitted to a host and trouble occurs in the communication between a DDC-supported non-volatile memory and a control means due to the communication between the DDC-supported non-volatile memory and the host, can be prevented.

DESCRIPTION OF REFERENCE NUMERALS

1 . . . LIQUID CRYSTAL PROJECTOR
1*a* . . . DVI CONNECTOR
2 . . . PERSONAL COMPUTER
3 . . . STB
4,5 . . . DVI CABLE
6 . . . MENU SCREEN
11 . . . DDC-SUPPORTED EEPROM
12 . . . SWITCH CIRCUIT
13 . . . CPU
14 . . . EEPROM

The invention claimed is:

1. A video display apparatus that supports a display data channel (DDC) and is connectable to a host apparatus which provides an input video signal to the video display apparatus, comprising:

a digital visual interface (DVI) connector to enable connection to an external display device;

only one DDC-supported non-volatile memory;

a switch circuit arranged between the DVI connector and the DDC-supported non-volatile memory, said switch circuit having a first terminal and a second terminal and being switchable therebetween;

a data memory, separate from the DDC-supported non-volatile memory, to store extended display identification (EDID) data for a digital television broadcasting (DTV) video signal and EDID data for a RGB video signal; and a processing unit;

said switch circuit being coupled to the DDC-supported non-volatile memory and said first terminal of the switch circuit being connected to the processing unit and said second terminal of the switch circuit being connected to the DVI connector, and during operation, (i) said processing unit determines whether the EDID data for the DTV video signal or the EDID data for the RGB video signal is to be supplied to the DDC-supported non-volatile memory, causes an appropriate one of the EDID data for the DTV video signal or the EDID data for the RGB video signal to be read out from the data memory and supplied by way of said first terminal to the DDC-supported non-volatile memory so as to be written therein, and then controls the switch circuit so as to connect the DDC-supported non-volatile memory to said second terminal such that the DDC-supported non-volatile memory is directly connected to the DVI connector, and (ii) when a kind of said input video signal supplied from the host apparatus has changed from the DTV video signal to the RGB video signal or from the RGB video signal to the DTV video signal after the EDID data corresponding to a previous input video signal had been written in the DDC-supported non-volatile memory, said processing unit causes the EDID data corresponding to a current input video signal to be read out from the data memory and written into said DDC-supported non-volatile memory such that the EDID data previously in the DDC-supported non-volatile memory is rewritten to that of the current input video signal, said processing unit determines whether the EDID data for the DTV video signal or the EDID data for the RGB video signal is to be supplied to the DDC-supported non-volatile memory through trial-and-error, such that when a video signal is input from the host the EDID data for the RGB video signal is supplied to the DDC-supported non-volatile memory, and when no video signal is input from the host the EDID data for the DTV video signal is supplied to the DDC-supported non-volatile memory.

2. The video display apparatus according to claim 1, the data memory stores various data items in addition to the EDID data for said plural kinds of video signals.

3. The video display apparatus according to claim 1, the data memory stores programs to be executed by said processing unit.

4. The video display apparatus according to claim 1, wherein said processing unit disconnects said DDC-supported non-volatile memory from said second terminal at the time of writing into said DDC-supported non-volatile memory.

5. The video display apparatus according to claim 1, said data memory stores other data in addition to the EDID data for the DTV video signal and the EDID data for the RGB video signal.

6. The video display apparatus according to claim 1, said data memory stores the EDID, data for the DTV video signal and the EDID data for the RGB video signal together with programs which should be executed by the processing unit.

* * * * *